Figure 1:
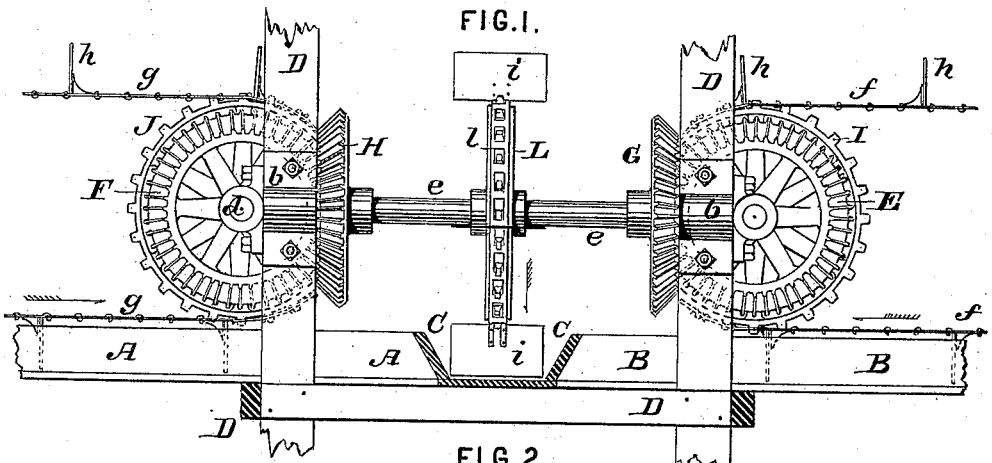

(No Model.)

J. M. DODGE.
CONVEYER MACHINE.

No. 358,652. Patented Mar. 1, 1887.

WITNESSES:
J. Henry Kaiser
Harry L. Ames

INVENTOR
James M. Dodge
By J. N. McIntire
ATTORNEY

UNITED STATES PATENT OFFICE.

JAMES M. DODGE, OF PHILADELPHIA, PENNSYLVANIA, ASSIGNOR TO THE EWART MANUFACTURING COMPANY, OF CHICAGO, ILLINOIS.

CONVEYER-MACHINE.

SPECIFICATION forming part of Letters Patent No. 358,652, dated March 1, 1887.

Application filed October 28, 1886. Serial No. 217,432. (No model.)

*To all whom it may concern:*

Be it known that I, JAMES M. DODGE, of Philadelphia, in the county of Philadelphia and State of Pennsylvania, have invented a new and useful Improvement in Conveyer-Machines; and I do hereby declare that the following is a full, clear, and exact description thereof, reference being had to the accompanying drawings, making part of this application.

My invention relates to that type or class of trough-conveyers in which a series of troughs or conduits are employed in connection with a series of carrier chains and flights for the purpose of conveying or transmitting material successively in different directions, but on substantially horizontal planes.

Previous to my invention it has been a universal practice in this type of conveyer machines or apparatus to have the construction and operation such that the material will be conveyed by one run of carrier chains and flights in a conveyer-trough in a given direction and from the leading end of such trough discharged into another trough located below the level of the first one, in which other and depressed trough the material is conveyed by another set of carrier chains and flights, and so on, according to the number of changes of direction in which the material may have to travel to get to its final destination. Under such construction and mode of operation it has not only been necessary to have the first trough located above the level of the trough crossing it, but it has also been essential that the flights coacting with said first trough should carry the material clear to the end of the trough to insure its discharge therefrom and descent into the next and lower trough; and it has also been necessary, on account of having the troughs located in different horizontal planes, to have the runs of chains, and consequently the chain-wheels, their shafts, and the gears for driving each shaft, located in different planes, thus necessitating considerable complexity in the machinery and rendering the whole contrivance expensive of construction and liable to derangement of its parts.

I have found by experiment and practice that in conveying different sorts of material through a trough or box by the action of the flights attached to the carrier-chain the material conveyed would be pushed or thrown toward and past the discharge end of such trough without having the flights travel nearly to the discharge end of said trough, and that the material, if discharged from the end of said trough onto a plane coincident with that of the bottom of the trough, will be piled up to a considerable extent on said plane and at a locality beyond the discharge end of the trough. Availing myself of these mechanical facts, I have found by practical experiment and experience that in the kind or type of conveyer apparatus to which my invention relates the material may be successfully discharged from one conveyer-trough into another located in the same plane or at the same level, but transversely to it, without having the flights, which leave the material in the first-named trough, travel nearly to the discharge end of the latter, and that under an arrangement of troughs arranged transversely to each other transverse sets of carrier-chains and carriers may be successfully employed to pass the material from one or more troughs into another at the same level, and to convey the material along in and from the last-mentioned trough; and I propose to provide for this a simple and efficient machine or apparatus of the type referred to, which will efficiently do the desired work, and in which the troughs are arranged on the same level, and in which, consequently, a series of carrier-chains and carriers running at angles with each other may be used, driven by a simple and efficient system of gearing in which the shafting of the system may all lie in the same horizontal plane.

To this main end and object my invention may be said to consist, essentially, in a series of conveyer-troughs and carrier-chains having the system of shafting and gearing for driving the series of chains constructed and arranged so that the shafts are all in substantially the same plane, and in which, preferably, the surface or portions of the troughs are, in like manner, all on the same level, all as will be hereinafter more fully explained, and as will be particularly pointed out and defined in the claim of this specification.

To enable those skilled in the art to make and use my invention, I will now proceed to more fully describe it, referring by letters of reference to the accompanying drawings, which form a part of this specification, and in which I have shown my invention carried out in that form which is the best now known to me, and in which I have so far successfully practiced it.

Figure 2:
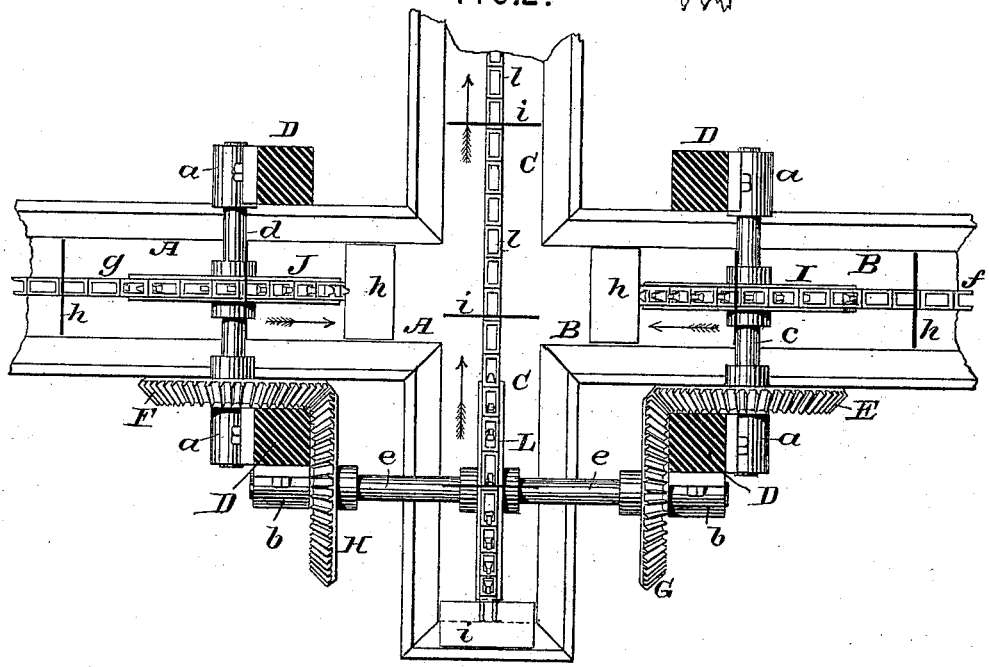

In the drawings, Figure 1 is a partial sectional elevation of so much of a conveyer apparatus as it is necessary to show for the purpose of illustrating my invention. Fig. 2 is a top view of what is shown in elevation at Fig. 1, and in both figures the same part will be found designated by the same letter of reference.

A and B represent two conveyer-troughs, of the usual form, arranged in the same horizontal plane and (in the case shown) in line with each other, while C is a third trough running transversely of the troughs A and B, and with its bottom on the same level therewith, the said troughs A and B communicating at their discharge ends with the trough C, for a purpose to be presently more fully explained. These troughs are, as usual, supported by a suitable frame-work, D, to the vertical portions or posts of which are secured the box or bearing in which are supported and work the drivers of the conveyer-machine shafting.

The system of shafting and gearing consists, as shown, of a shaft, c, the journal-boxes a of which are in like manner secured to the frame-work D, another shaft, d, which is arranged parallel to the shaft c, the journal-boxes a of which are in like manner secured to the frame-work, and the third shaft, e, the journal-boxes b of which are also supported by the vertical portions of the frame-work D. These shafts, as shown, are arranged with their axes in the same horizontal plane, and those marked c and d are provided, respectively, with beveled gears E and F, which engage with beveled wheels G and H, that are keyed fast to the shaft e, and to all these shafts c, d, and e are respectively secured chain-wheels I, J, and L, that are arranged centrally over the conveyer-troughs B, C, and A, after the fashion clearly illustrated in the drawings.

f is a carrier-chain which travels on the periphery of the chain-wheel I, while g is a similar chain mounted to run on the wheel J, and l is another chain which, in like manner, engages with the chain-wheel L. The carrier-chains f and g are provided with the usual flights, h, while the chain-wheel l has flights or carriers i, and the carriers h of the carrier-chains f and g run, respectively, in the two troughs A and B, while the flights i of the chain l travel in the transverse trough C, these flights and the chains to which they are attached traveling in their respective troughs in the directions indicated by the arrows on the drawings.

I have preferably arranged the shafts c and d in such a manner relatively to the discharge ends of the troughs A and B and have so sized the chain-wheels I and J that said flights h do not run clear out to the discharge ends of said troughs; but I have found in practice that when made as shown the material conveyed through the troughs A and B by the flights h will be transmitted clear up to and either pushed or allowed to pile up and slide by gravity beyond the said discharge ends of said troughs and onto the floor or bottom of the transverse trough C. The material thus discharged from the troughs A and B onto the bottom or floor of the transverse trough C will be acted upon by the flights i of the transverse chain l, and will be easily and efficiently conveyed along through the trough C in the direction indicated by the arrows in the drawings.

It will be observed that in a contrivance constructed as shown and described the material conveyed through either one or both of the troughs A and B and pushed or thrown from the discharge ends of said trough or troughs onto the bottom of the trough C will be as efficiently conveyed by the flights i through the trough C as if said trough C were located, as usual, in a plane below that of the troughs A and B, and the material caused or allowed to drop or descend into said trough C, while at the same time all the complexity and expense of construction due to having the troughs located in different horizontal planes and the gears and shafts similarly arranged are avoided.

In my improved construction of conveyer-machines an exceedingly simple, efficient, and durable system of shafting and gears may be employed, consisting, as shown, simply of the three shafts mounted on the posts of the frame-work D and provided with two sets of beveled gears arranged in pairs, as illustrated. Of course greater simplicity is attained in the construction and arrangement together of the parts proper, and less room is necessary for the entire apparatus than is required for the old-fashioned form of machine, in which the troughs are located in different planes and cross over each other. However, the main advantages of my invention might be attained, it will be understood, even were the trough C located slightly below the level of the troughs communicating with it, in which case the only change necessary in the working parts of the conveyer would be a sufficient increase in the diameter of the chain-wheel L to cause the flights of the chain running therefrom to travel in the proper relationship to the support of said trough C. The gist of my invention, therefore, rests, mainly, in simply having an efficient system or arrangement of shafts and gears with their carrier-chains, substantially as shown, with all the axes in the same plane, so that two sets of beveled gears only are needed, as shown and described. I, however, prefer to have the troughs arranged in the same plane, as shown, as such an arrangement lends a greater simplicity of construction and durability to the trough.

Having now so fully explained my invention that those skilled in the art can understand and practice it, either in the precise form shown or in some other form substantially the same in principle of construction and mode of operation, what I claim as new, and desire to secure by Letters Patent, is—

A conveyer machine or apparatus for conveying material in several different directions, as specified, composed of a series of traveling conveyer devices or flights, a series of conveyer-troughs communicating with each other, as specified, and a system of shafts and gears (for driving the chains or bands carrying the flights) which have their axes all located in substantially the same plane, the whole arranged to operate substantially as and for the purpose hereinbefore set forth.

In witness whereof I have hereunto set my hand this 7th day of August, 1886.

JAMES M. DODGE.

In presence of—
H. J. KIELY,
W. H. CLARKE.